United States Patent
Yamanashi et al.

(10) Patent No.: US 10,549,688 B2
(45) Date of Patent: Feb. 4, 2020

(54) FAKE ENGINE SOUND CONTROL DEVICE AND FAKE ENGINE SOUND CONTROL METHOD

(71) Applicant: PANASONIC INTELLECTUAL PROPERTY MANAGEMENT CO., LTD., Osaka (JP)

(72) Inventors: Tomofumi Yamanashi, Kanagawa (JP); Masafumi Tao, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/095,068

(22) PCT Filed: Apr. 13, 2017

(86) PCT No.: PCT/JP2017/015046
§ 371 (c)(1),
(2) Date: Oct. 19, 2018

(87) PCT Pub. No.: WO2017/187991
PCT Pub. Date: Nov. 2, 2017

(65) Prior Publication Data
US 2019/0111841 A1    Apr. 18, 2019

(30) Foreign Application Priority Data
Apr. 26, 2016 (JP) .................. 2016-088100

(51) Int. Cl.
*B60Q 5/00* (2006.01)
(52) U.S. Cl.
CPC .............. *B60Q 5/008* (2013.01); *B60Q 5/00* (2013.01)
(58) Field of Classification Search
CPC .................. B60Q 5/008; G10K 15/02
(Continued)

(56) References Cited

U.S. PATENT DOCUMENTS

2012/0130580 A1* 5/2012 Omote ............... B60Q 5/008
701/22
2012/0323442 A1* 12/2012 Tanaka ............... B60Q 5/008
701/36

(Continued)

FOREIGN PATENT DOCUMENTS

JP    2002-233001    8/2002
JP    2009-063968    3/2009
(Continued)

OTHER PUBLICATIONS

Official Communication issued in International Pat. Appl. No. PCT/JP2017/015046, dated Jul. 18, 2017.
(Continued)

*Primary Examiner* — Fabricio R Murillo Garcia
(74) *Attorney, Agent, or Firm* — Greenblum & Bernstein, P.L.C.

(57) ABSTRACT

A fake engine sound control device includes an environment information acquisition unit, a vehicle speed acquisition unit, an engine speed acquisition unit, a fake engine sound generator, and a fake engine sound controller. The environment information acquisition unit acquires environment information. The vehicle speed acquisition unit acquires vehicle speed information. The engine speed acquisition unit acquires rotation speed information. The fake engine sound generator generates a fake engine sound. The fake engine sound controller determines, based on the environment information and the vehicle speed information, whether leading to a target vehicle speed is required, the target vehicle speed being different from the vehicle speed indicated by the vehicle speed information, and controls, when leading to the target vehicle speed is required, the fake engine sound generator based on the target vehicle speed and the rotation speed information.

13 Claims, 3 Drawing Sheets

(58) Field of Classification Search
USPC .......................................................... 340/441
See application file for complete search history.

(56) References Cited

U.S. PATENT DOCUMENTS

| 2013/0016218 A1* | 1/2013 | Asao ...................... B60Q 5/008 |
| | | 348/148 |
| 2013/0249680 A1* | 9/2013 | Goto ...................... B60Q 5/008 |
| | | 340/425.5 |
| 2014/0177866 A1* | 6/2014 | Peachey .................. B60Q 5/00 |
| | | 381/86 |
| 2016/0016513 A1* | 1/2016 | Di Censo ............... B60Q 9/008 |
| | | 340/467 |

FOREIGN PATENT DOCUMENTS

| JP | 4345675 | 7/2009 |
| JP | 2013-218079 A | 10/2013 |

OTHER PUBLICATIONS

Notice of Reasons for Refusal in Japan dated Dec. 17, 2019 for Japanese Patent Application No. 2016-088100.

* cited by examiner

FIG. 3

| FAKE ENGINE SOUND | FUNDAMENTAL FREQUENCY | HARMONIC COMPONENT | SOUND VOLUME |
|---|---|---|---|
| REFERENCE ENGINE SOUND Sn | f0 | 2nd, 4th, 6th | V0 |
| ENGINE SOUND Sd FOR LEADING TO LOWER SPEED | f1(>f0) | 2nd, 4th, 6th, 6.5th | V1(>V0) |
| ENGINE SOUND Su FOR LEADING TO HIGHER SPEED | f2(<f0) | 2nd, 4th | V2(<V0) |

FAKE ENGINE SOUND CONTROL DEVICE AND FAKE ENGINE SOUND CONTROL METHOD

This application is a U.S. national stage application of the PCT International Application No. PCT/JP2017/015046 filed on Apr. 13, 2017, which claims the benefit of foreign priority of Japanese patent application 2016-088100 filed on Apr. 26, 2016, the contents all of which are incorporated herein by reference.

TECHNICAL FIELD

The present invention relates to a fake engine sound control device and a fake engine sound control method.

BACKGROUND ART

In general, electric vehicles (EV) and hybrid vehicles (HV) have structures with low sound emission and are superior in quietness to gasoline-powered vehicles. In contrast, an engine sound emitted from such a gasoline-powered vehicle is one element from which a pedestrian notices approach of a vehicle or a driver receives a speed feeling or a travelling feeling; thus, it is impossible to unconditionally deny such a sound. There has been proposed a technique for EVs or HVs to emit a fake engine sound to a cabin of a vehicle or to the outside of the vehicle (for example, PTLs 1, 2). The fake engine sound is an electronically-processed sound that evokes an engine sound of a vehicle or a travel sound including an engine sound.

PTL 1 discloses a technique of controlling a sound volume of the fake engine sound based on a driving environment of a vehicle. For example, the disclosure includes a technique of reducing the sound volume of the fake engine sound or muting the fake engine sound to make ambient sounds easily caught while a vehicle is travelling along a route guided by a car navigation, at a railroad crossing, or near an urban area. The disclosure further includes a technique of increasing the sound volume of the fake engine sound to alert a driver when, for example, a vehicle speed exceeds a speed limit.

Further, PTL 2 discloses a technique of controlling a volume of a fake engine sound based on a vehicle cabin environment. The disclosure includes, for example, a technique of increasing the sound volume of the fake engine sound during playback of a rock-style music, and reduces the sound volume of the fake engine sound during playback of a classic-type music or a conversation made by an occupant.

CITATION LIST

Patent Literature

PTL 1: Unexamined Japanese Patent Publication No. 2002-233001
PTL 2: Japanese Patent No. 4345675

SUMMARY OF THE INVENTION

The present invention provides a fake engine sound control device and a fake engine sound control method that are designed to use a fake engine sound to unintentionally lead to a preferable vehicle speed without giving uncomfortable feeling to a driver.

A fake engine sound control device according to an aspect of the present invention includes an environment information acquisition unit, a vehicle speed acquisition unit, an engine speed acquisition unit, a fake engine sound generator, and a fake engine sound controller. The environment information acquisition unit acquires environment information indicating a travel environment of a vehicle. The vehicle speed acquisition unit acquires vehicle speed information indicating a vehicle speed of the vehicle. The engine speed acquisition unit acquires rotation speed information indicating an engine speed of the vehicle. The fake engine sound generator generates a fake engine sound that evokes an engine sound of the vehicle. The fake engine sound controller determines, based on the environment information and the vehicle speed information, whether leading to a target vehicle speed is required, the target vehicle speed being different from the vehicle speed indicated by the vehicle speed information, and controls, when leading to the target vehicle speed is required, the fake engine sound generator based on the target vehicle speed and the rotation speed information.

A fake engine sound control method according to another aspect of the present invention includes a step (A) of acquiring environment information, a step (B) of acquiring vehicle speed information, a step (C) of acquiring rotation speed information, a step (D) of generating a fake engine sound, and a step (E) of making a determination. The environment information indicates a travel environment of a vehicle. The vehicle speed information indicates a vehicle speed of the vehicle. The rotation speed information indicates an engine speed of the vehicle. The fake engine sound is a sound that evokes an engine sound of the vehicle. In the step (E), a determination is made, based on the environment information and the vehicle speed information, whether leading to a target vehicle speed is required, the target vehicle speed being different from the vehicle speed indicated by the vehicle speed information. In the step (D), when a determination is made that leading to the target vehicle speed is required in the step (E), the fake engine sound is generated based on the target vehicle speed and the rotation speed information.

A fake engine sound control method according to yet another aspect of the present invention includes acquiring environment information, acquiring vehicle speed information, acquiring rotation speed information, generating a fake engine sound, making a determination, and performing control. The environment information indicates a travel environment of a vehicle. The vehicle speed information indicates a vehicle speed of the vehicle. The rotation speed information indicates an engine speed of the vehicle. The fake engine sound is a sound that evokes an engine sound of the vehicle. In the making a determination, a determination is made, based on the environment information and the vehicle speed information, whether leading to a target vehicle speed is required, the target vehicle speed being different from the vehicle speed indicated by the vehicle speed information. In the performing control, when leading to the target vehicle speed is required, generation of the fake engine sound is controlled based on the target vehicle speed and the rotation speed information.

According to the present invention, it is possible to use the fake engine sound to unintentionally lead to a preferable vehicle speed without giving uncomfortable feeling to a driver.

BRIEF DESCRIPTION OF DRAWINGS

FIG. 3 is a diagram showing a composition of a fake engine sound.

DESCRIPTION OF EMBODIMENT

Before an exemplary embodiment of the present invention is described, problems in a conventional technique will be briefly described. In PTL 1, while a vehicle is travelling in an area having a speed limit at a speed exceeding the speed limit, an increase in the sound volume of the fake engine sound gives a driver a feeling of fear to lead to a lower speed state. Further, as the technique of leading a travel state, a technique of presenting a warning sound or a warning message to a driver is known. However, techniques such as merely increasing the sound volume of the fake engine sound and presenting the warning sound or the warning message are uncomfortable for a driver, which significantly reduces comfort in driving.

Figure 1:
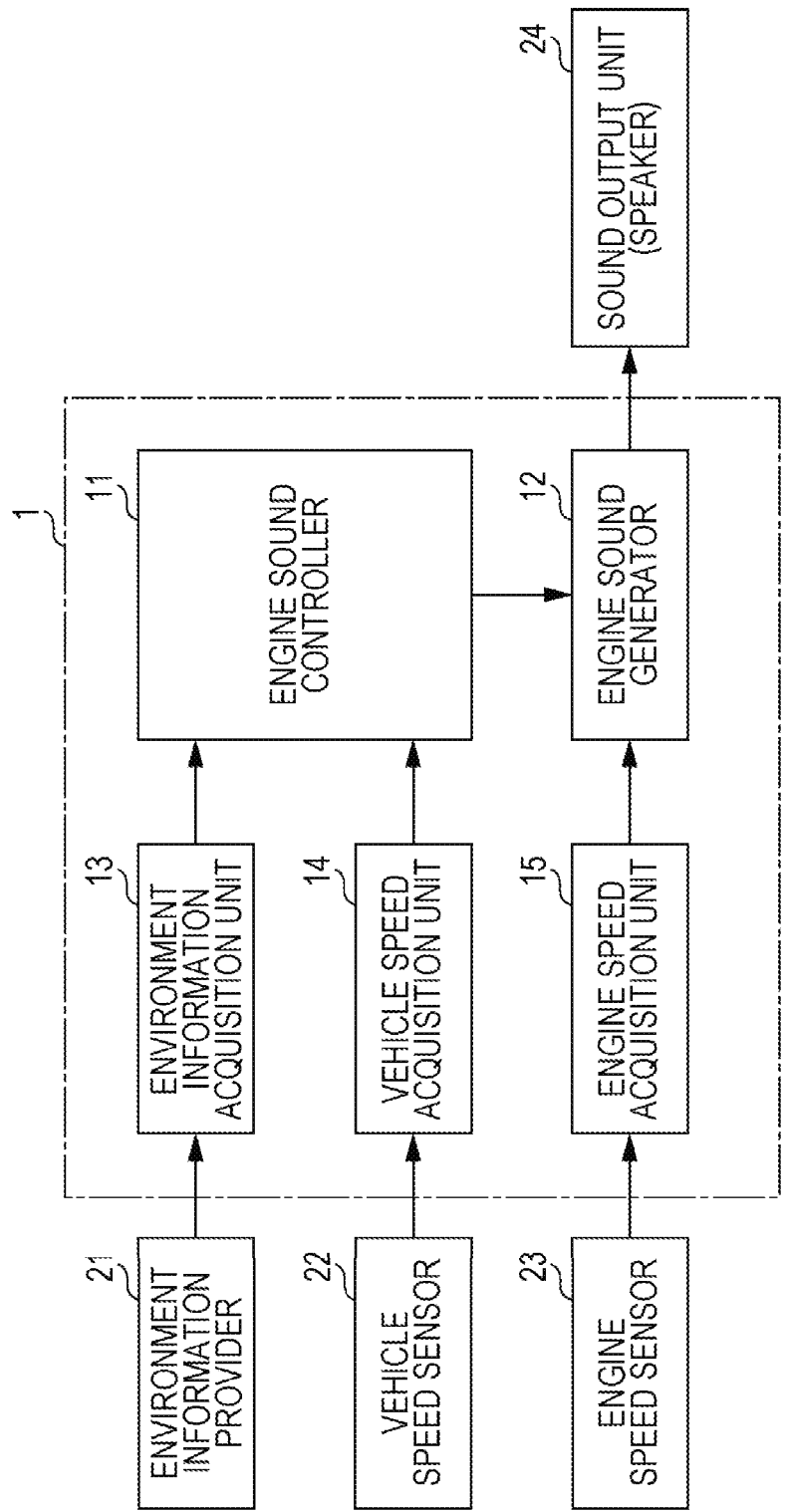
FIG. 1 is a diagram showing a fake engine sound control device according to an exemplary embodiment.

Hereinafter, the exemplary embodiment of the present invention will be described in detail with reference to the drawings. FIG. 1 is a diagram showing fake engine sound control device 1 according to the exemplary embodiment. Fake engine sound control device 1 is designed to be mounted on an EV or an HV, both of which have a motor as a driving source.

As shown in FIG. 1, fake engine sound control device 1 includes engine sound controller 11, engine sound generator 12, environment information acquisition unit 13, vehicle speed acquisition unit 14, and engine speed acquisition unit 15.

Fake engine sound control device 1 includes, for example, a central processing unit (CPU), a read only memory (ROM), and a random access memory (RAM) (none of which are shown). In fake engine sound control device 1, for example, the CPU reads a control program associated with processing to be performed from the ROM into the RAM and executes the control program to make respective functions of the above-described components work. The respective functions of the above-described components will be described later.

Fake engine sound control device 1 generates an engine sound electronically processed (a fake engine sound) based on environment information provided from environment information provider 21, vehicle speed information provided from vehicle speed sensor 22, and rotation speed information provided from engine speed sensor 23. The fake engine sound thus generated is output to sound output unit (speaker) 24 provided to a vehicle cabin. A vehicle such as an EV or an HV does not emit such an engine sound as is emitted from a gasoline-powered vehicle, but an occupant of the vehicle can have perception of a current vehicle speed state from the fake engine sound generated.

The environment information includes, for example, information on a road the vehicle is travelling on such as speed limit information (maximum speed information and minimum speed information), accident frequency information indicating an accident-prone area, traffic information indicating road congestion (including information on roadworks, a traffic jam, a traffic accident, and a fallen object), and gradient information (upward slope information and downward slope information).

For example, a car navigation system used as environment information provider 21 allows the speed limit information, the accident frequency information, the gradient information, or the traffic information of a road the vehicle is travelling on to be acquired. Such a car navigation system includes a global positioning system (GPS) unit, a communication unit that acquires road traffic information from a road traffic information center, and a storage unit that stores map information. The GPS unit includes a GPS receiver that detects (measures) a position of an own vehicle based on a radio wave transmitted from a satellite, a gyroscope sensor that detects a rotational angular velocity of the own vehicle, an acceleration sensor, and the like.

Note that, examples of environment information provider 21 include, in addition to the car navigation system, a smartphone, an information transmitter installed on a road, and an on-board camera.

Vehicle speed sensor 22 is a sensor that detects a vehicle speed. Engine speed sensor 23 is a sensor that detects an engine speed (for example, revolutions per minute (RPM)). Note that the vehicle speed information originating from vehicle speed sensor 22 and the rotation speed information originating from engine speed sensor 23 may be provided from a vehicle engine control unit (ECU) to fake engine sound control device 1.

Engine sound controller 11 determines whether the current vehicle speed state is appropriate based on the environment information provided from environment information provider 21 and the vehicle speed information provided from vehicle speed sensor 22, and outputs the determination result to engine sound generator 12.

Engine sound generator 12 generates the fake engine sound based on the rotation speed information from engine speed acquisition unit 15 and the determination result from engine sound controller 11, and outputs the fake engine sound to sound output unit 24. Engine sound generator 12 generates the fake engine sound by, for example, stationary sound loop reproduction or harmonic component synthesis calculation. The stationary sound loop reproduction is to repeatedly reproduce a stationary engine sound recorded for several seconds. The harmonic component synthesis calculation is to calculate and synthesize respective pure tones of harmonic components of an engine in accordance with a vehicle speed state. In the exemplary embodiment, a description will be given of a configuration where the fake engine sound is generated by the harmonic component synthesis calculation.

For example, in an in-line four cylinder engine, combustion is made four times for two rotations of a crankshaft; thus, even-numbered components, i.e., 2N-order harmonic components (where N is a positive integer) of a frequency equivalent to an engine speed (engine speed [rpm]/60, hereinafter, referred to as a "fundamental frequency") are main components of engine sounds. Engine sound generator 12 synthesizes the 2N-order harmonic components (where N is 1, 2, 3, or the like) of the fundamental frequency to generate the fake engine sound.

Figure 2:
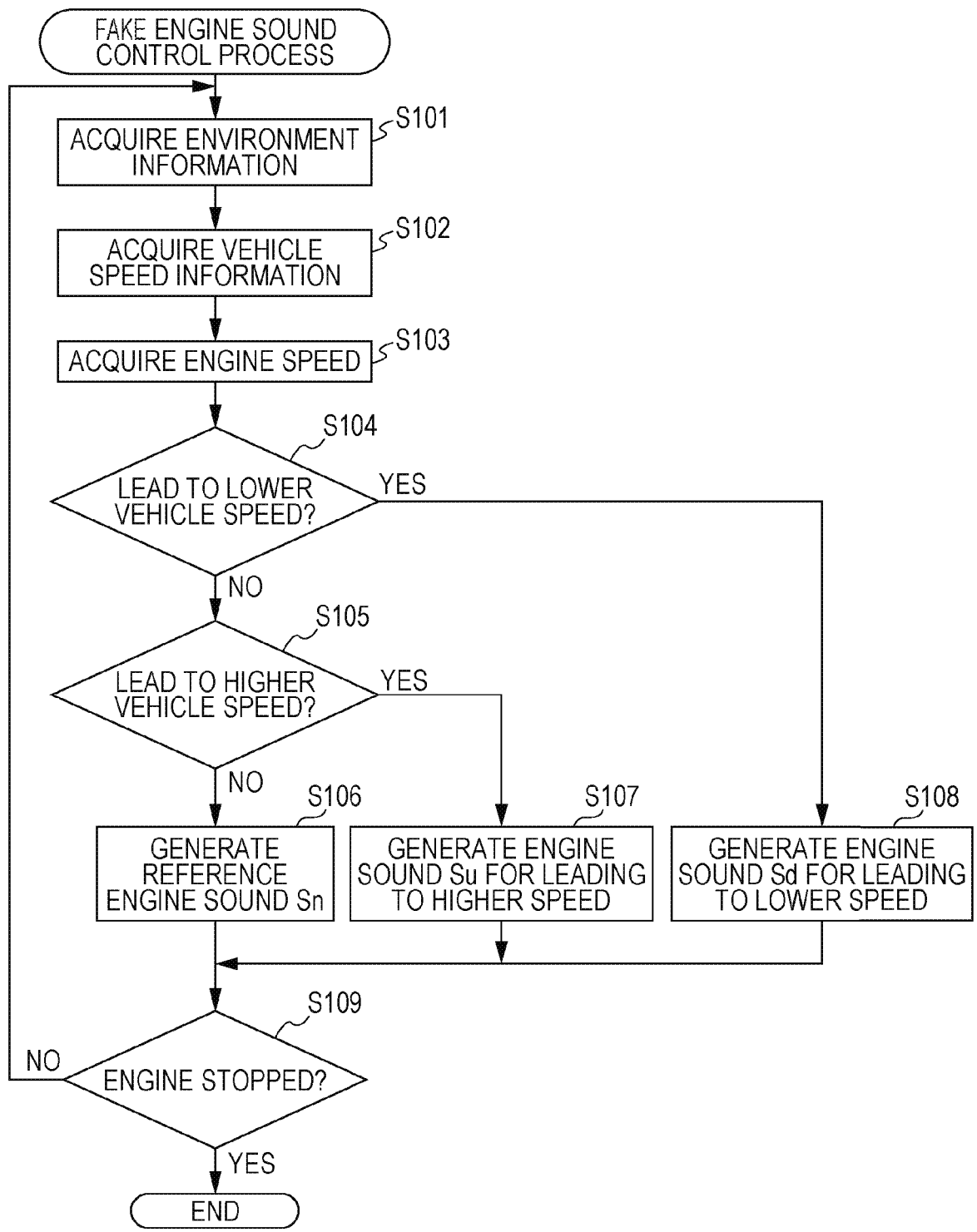
FIG. 2 is a flowchart showing a fake engine sound control process.

FIG. 2 is a flowchart showing a fake engine sound control process. The CPU of fake engine sound control device 1 reads, in response to, for example, the start of a vehicle engine, the control program stored in the ROM and executes the control program, thereby causing this process to be performed.

In step S101 in FIG. 2, the CPU of fake engine sound control device 1 (works as environment information acquisition unit 13) acquires the environment information provided from environment information provider 21. In step S102, the CPU (works as vehicle speed acquisition unit 14) acquires the vehicle speed information provided from vehicle speed sensor 22. Further, in step S103, the CPU (works as engine speed acquisition unit 15) acquires the rotation speed information provided from engine speed sensor 23.

In step S104, the CPU (works as engine sound controller 11) determines, based on the environment information and the vehicle speed information thus acquired, whether the vehicle speed needs to be made lower than a vehicle speed indicated by the vehicle speed information. "Vehicle speed needs to be made lower" refers to "a driver needs to perform a deceleration operation (an accelerator release operation)". When the vehicle speed needs to be made lower ("YES" in step S104), the process proceeds to step S108. When the vehicle speed need not be made lower ("NO" in step S104), the process proceeds to step S105.

For example, a comparison is made between speed limit information (maximum speed information) of the current travel section and the vehicle speed information, and when the current vehicle speed is higher than the maximum speed by a predetermined speed, a determination is made that the vehicle speed needs to be made lower. Further, for example, a comparison is made between speed limit information of a forward travel section (a section in which the vehicle is to travel) and the vehicle speed information, and when the vehicle speed, if the current vehicle speed is maintained, will be higher than the maximum speed of the forward travel section, a determination is made that the vehicle speed needs to be made lower.

Further, for example, when an accident-prone area is located in the forward travel section, a comparison is made between an appropriate vehicle speed (a vehicle speed, for example, 50 km/h, at which the vehicle safely travels through the accident-prone area) determined based on the accident frequency information and the vehicle speed information. Then, when the current vehicle speed is higher than the appropriate vehicle speed, a determination is made that the vehicle speed needs to be made lower.

Further, for example, when a traffic accident or the like has happened in the forward travel section, a comparison is made between an appropriate vehicle speed (a vehicle speed, for example, 40 km/h, at which the vehicle safely avoids the traffic accident or the like) determined based on the traffic information and the vehicle speed information. Then, when the current vehicle speed is higher than the appropriate vehicle speed, a determination is made that the vehicle speed needs to be made lower.

Further, for example, when the forward travel section includes a downward slope, a comparison is made between an appropriate vehicle speed (a vehicle speed, for example, 80 km/h (on the assumption that the vehicle is travelling on a freeway) at which the vehicle safely travels even when the vehicle unintentionally accelerates due to the downward slope) determined based on the gradient information (downward slope information) and the vehicle speed information. Then, when the current vehicle speed is higher than the appropriate vehicle speed, a determination is made that the vehicle speed needs to be made lower.

In step S105, the CPU (works as engine sound controller 11) determines, based on the environment information and the vehicle speed information acquired, whether the vehicle speed needs to be made higher than the vehicle speed indicated by the vehicle speed information. "Vehicle speed needs to be made higher" refers to "a driver needs to perform an acceleration operation (an accelerator step-on operation)". When the vehicle speed needs to be made higher ("YES" in step S105), the process proceeds to step S107. When the vehicle speed need not be made higher ("NO" in step S105), the process proceeds to step S106.

For example, a comparison is made between the speed limit information (minimum speed information) of the forward travel section and the vehicle speed information near a junction of the freeway, and when the vehicle speed, if the current vehicle speed is maintained, will lower than the minimum speed of the forward travel section, a determination is made that the vehicle speed needs to be made higher.

Further, for example, when the forward travel section includes an upward slope, a comparison is made between an appropriate vehicle speed (a vehicle speed, for example, 80 km/h (on the assumption that the vehicle is travelling on a freeway) which suppresses an increase in risk of collision with a following vehicle even when the vehicle unintentionally decelerates due to the upward slope) determined based on the gradient information (upward slope information) and the vehicle speed information. Then, when the current vehicle speed is lower than the appropriate vehicle speed, a determination is made that the vehicle speed needs to be made higher.

In step S106, the CPU (works as engine sound generator 12) generates, as a fake engine sound, reference engine sound Sn that corresponds to the current vehicle speed and outputs reference engine sound Sn to sound output unit 24. Reference engine sound Sn is a sound that evokes a real travel sound corresponding to the vehicle speed. For example, reference engine sound Sn includes, as shown in FIG. 3, a 2nd-order harmonic component, 4th-order harmonic component, and 6th-order harmonic component of fundamental frequency f0 based on the rotation speed information acquired and is output at sound volume V0. The driver can have perception of the current vehicle speed state from reference engine sound Sn.

In step S107, the CPU (works as engine sound generator 12) generates, as a fake engine sound, engine sound Su for leading to a higher speed and outputs engine sound Su for leading to a higher speed to sound output unit 24. For example, engine sound Su for leading to a higher speed includes, as shown in FIG. 3, a 2nd-component and 4th-component of fundamental frequency and is output at sound volume V2 that is lower than the sound volume of reference engine sound Sn. Fundamental frequency f2 of engine sound Su for leading to a higher speed is lower than fundamental frequency f0 that is equivalent to an engine speed. Engine sound Su for leading to a higher speed is output at a frequency lower than the frequency of reference engine sound Sn that is a real travel sound (f2<f0) and at a sound volume lower than the sound volume of reference engine sound Sn (V2<V0). Further, engine sound Su for leading to a higher speed includes less high-order harmonic components than reference engine sound Sn. Therefore, the driver feels like the vehicle travels at a vehicle speed lower than the actual vehicle speed, and unintentionally performs the acceleration operation, that is, steps on the accelerator.

In step S108, the CPU (works as engine sound generator 12) generates, as a fake engine sound, engine sound Sd for leading to a lower speed and outputs engine sound Sd for leading to a lower speed to sound output unit 24. For example, engine sound Sd for leading to a lower speed includes, as shown in FIG. 3, a 2nd-component, 4th-component, 6th-component, and 6.5th-component (half-order component) of fundamental frequency f1, and is output at sound volume V1 higher than the sound volume of reference engine sound Sn. Fundamental frequency f1 of engine sound Sd for leading to a lower speed is higher than fundamental frequency f0 that is equivalent to an engine speed. Engine sound Sd for leading to a lower speed is output at a frequency higher than the frequency of reference engine sound Sn that is a real travel sound (f1>f0) and at a sound volume higher than the sound volume of reference engine sound Sn (V1>V0). Further, engine sound Sd for leading to a lower speed includes more high-order harmonic components than reference engine sound Sn, and further includes a half-order harmonic component (6.5th-order harmonic component in FIG. 3) that is an unusual sound. Therefore, the driver feels like the vehicle travels at a vehicle speed higher than the actual vehicle speed, and unintentionally performs the deceleration operation, that is, releases the accelerator.

In step S109, the CPU determines whether the engine has been stopped. When the engine has been stopped ("YES" in step S109), the fake engine sound control process comes to an end. When the engine has not been stopped ("NO" in step S109), the process proceeds to step S101.

According to the process described above, for example, when the vehicle travels at 90 km/h in a travel section having a speed limit of 80 km/h, a fake engine sound equivalent to 100 km/h is generated and output. The deceleration operation performed by the driver reduces the vehicle speed from 90 km/h to 80 km/h, which causes the fake engine sound to change from an engine sound equivalent to 100 km/h to an engine sound equivalent to 80 km/h.

As described above, fake engine sound control device 1 according to the exemplary embodiment includes environment information acquisition unit 13, vehicle speed acquisition unit 14, engine speed acquisition unit 15, engine sound generator 12 (fake engine sound generator), and engine sound controller 11 (fake engine sound controller). Environment information acquisition unit 13 acquires the environment information indicating a travel environment of a vehicle. Vehicle speed acquisition unit 14 acquires the vehicle speed information indicating a vehicle speed of the vehicle. Engine speed acquisition unit 15 acquires the rotation speed information indicating an engine speed of the vehicle. Engine sound generator 12 generates a fake engine sound that evokes an engine sound of the vehicle. Engine sound controller 11 determines, based on the environment information and the vehicle speed information, whether leading to a target vehicle speed is required, the target vehicle speed being different from the vehicle speed indicated by the vehicle speed information, and controls, when leading to the target vehicle speed is required, engine sound generator 12 based on the target vehicle speed and the rotation speed information.

Further, a fake engine sound control method according to the exemplary embodiment includes step (A) of acquiring environment information (step S101 in FIG. 2), step (B) of acquiring vehicle speed information (step S102), step (C) of acquiring rotation speed information (step S103), step (D) of generating a fake engine sound (steps S106 to S108), and step (E) of making a determination (steps S104, S105). The environment information indicates a travel environment of a vehicle. The vehicle speed information indicates a vehicle speed of the vehicle. The rotation speed information indicates an engine speed of the vehicle. The fake engine sound is a sound that evokes an engine sound of the vehicle. In step (E), a determination is made, based on the environment information and the vehicle speed information, whether leading to a target vehicle speed is required, the target vehicle speed being different from the vehicle speed indicated by the vehicle speed information. In step (D), when a determination is made that leading to the target vehicle speed is required in step (E) ("YES" in step S104 or "YES" in step S105), the fake engine sound is generated based on the target vehicle speed and the rotation speed information.

Further, a fake engine sound control method according to another aspect of the exemplary embodiment includes acquiring environment information (step S101 in FIG. 2), acquiring vehicle speed information (step S102), acquiring rotation speed information (step S103), generating a fake engine sound (steps S106 to S108), making a determination (steps S104, S105), and performing control ("YES" in step S104 or "YES" in step S105). The environment information indicates a travel environment of a vehicle. The vehicle speed information indicates a vehicle speed of the vehicle. The rotation speed information indicates an engine speed of the vehicle. The fake engine sound is a sound that evokes an engine sound of the vehicle. In the making a determination, a determination is made, based on the environment information and the vehicle speed information, whether leading to a target vehicle speed is required, the target vehicle speed being different from the vehicle speed indicated by the vehicle speed information. In the performing control, when leading to the target vehicle speed is required ("YES" in step S104 or "YES" in step S105), generation of the fake engine sound is controlled based on the target vehicle speed and the rotation speed information.

With fake engine sound control device 1 and the fake engine sound control method according to the exemplary embodiment, it is possible to use the fake engine sound to unintentionally lead to a preferable vehicle speed without giving uncomfortable feeling to a driver. Unlike the conventional techniques that present a warning sound or a message, the fake engine sound a driver always hear during travelling is used, thereby preventing comfort from being reduced, and increasing driving safety.

Although the present invention has been specifically described above on the basis of the exemplary embodiment, the present invention is not limited to the above exemplary embodiment, and various modifications can be made without departing from the spirit of the present invention.

For example, the environment information may include physical information on a driver or weather information (rain, snow). The physical information on a driver may be acquired through a fatigue detection system that monitors, for example, a position or an angle of a head of a driver and a line of sight of the driver to detect a degree of fatigue of the driver. Alternatively the physical information on a driver may be acquired through a fatigue detection system. The fatigue detection system includes a contact sensor and a non-contact sensor and analyzes a pulse, a temperature, blood components, and the like of the driver to detect a degree of fatigue of the driver. The weather information can be acquired through, for example, a weather information service on the Internet. When the degree of fatigue of the driver is high or the weather is bad, a comparison is made between the determined appropriate vehicle speed and the vehicle speed information, and the engine sound for leading to a lower speed is generated and output.

For example, the environment information may include a vehicle-to-vehicle distance to a preceding vehicle (or a following vehicle). The vehicle-to-vehicle distance is detected by for example, an on-board camera or a millimeter-wave radar. When the vehicle-to-vehicle distance to a preceding vehicle is less than or equal to a threshold, the engine sound for leading to a lower speed is output.

Further, the predetermined speed or the appropriate speed (threshold) determined for each event according to the exemplary embodiment may be varied in accordance with conditions. Specifically in a case of an aged driver, the threshold is determined for higher safety. For example, a configuration where the engine sound for leading to a lower speed is output when the current vehicle speed exceeds the speed limit by 10 km/h or more may be replaced with a configuration where the engine sound for leading to a lower speed is output when the current vehicle speed exceeds the speed limit by 5 km/h or more. Alternatively a driver may select either of the configurations in accordance with a preference of the driver.

Furthermore, with the fake engine sound control device according to the present invention, it is possible to lead to a vehicle speed state where fuel efficiency is improved.

Note that the harmonic components of each of the engine sounds shown in FIG. 3 are merely examples and are not particularly limited. The engine sound for leading to a lower speed may be any engine sound as long as the engine sound evokes a vehicle speed higher than a vehicle speed a driver recognizes. In contrast, the engine sound for leading to a higher speed may be any engine sound as long as the engine sound evokes a vehicle speed lower than a vehicle speed a driver recognizes. Furthermore, the engine sound for leading to a lower speed may include a natural noise other than the above-described components associated with engine speeds such as a back-fire or an after-fire.

It should be construed that the exemplary embodiment disclosed herein is illustrative in all aspects, and is not restrictive. The scope of the present invention is represented by the scope of the claims and not by the above description, and it is intended that all modifications within the sense and scope equivalent to the claims are involved in the scope of the present invention.

INDUSTRIAL APPLICABILITY

The present invention is suitable for the fake engine sound control device that uses the fake engine sound to suitably lead the vehicle speed state of a vehicle.

REFERENCE MARKS IN THE DRAWINGS 1 fake engine sound control device
11 engine sound controller
12 engine sound generator
13 environment information acquisition unit
14 vehicle speed acquisition unit
15 engine speed acquisition unit
21 environment information provider
22 vehicle speed sensor
23 engine speed sensor
24 sound output unit

The invention claimed is:

1. An engine sound control device comprising:
at least one processor connected to a sound output device of an electric or hybrid vehicle to output a sound; and
at least one memory coupled to the at least one processor, the at least one memory storing at least one program that, when executed by the at least one processor, causes the engine sound control device to:
acquire environment information indicating a travel environment of the electric or hybrid vehicle;
acquire vehicle speed information indicating a vehicle speed of the electric or hybrid vehicle;
acquire rotation speed information indicating a rotation speed of an engine of the electric or hybrid vehicle;
determine, based on the environment information and the vehicle speed information, whether leading the speed of the electric or hybrid vehicle to a target vehicle speed is required;
in response to determining that leading the speed of the electric or hybrid vehicle to the target vehicle is not required, control the sound output device to output a first engine sound; and
in response to determining that leading the speed of the electric or hybrid vehicle to the target vehicle is required, control the sound output device to output a second engine sound, the second engine sound being different from the first engine sound, and being based on the target vehicle speed and the rotation speed information,
wherein, when the target vehicle speed is lower than the vehicle speed indicated by the vehicle speed information, a vehicle speed evoked by the second engine sound is greater than a vehicle speed evoked by the first engine sound.

2. The engine sound control device according to claim 1, wherein the environment information includes maximum speed information of a road the electric or hybrid vehicle is travelling on, accident frequency information indicating an accident-prone area, traffic information indicating road congestion, or downward slope information indicating that a travel section is a downward slope.

3. The engine sound control device according to claim 1, wherein a fundamental frequency of the second engine sound is higher than a fundamental frequency of the first engine sound.

4. The engine sound control device according to claim 1, wherein a number of harmonic components of the second engine sound is greater than a number of harmonic components of the first engine sound.

5. The engine sound control device according to claim 1, wherein a number of higher-order harmonic components of the second engine sound is greater than a number of higher-order harmonic components of the first engine sound.

6. The engine sound control device according to claim 1, wherein the second engine sound includes a half-order harmonic component.

7. The engine sound control device according to claim 1, wherein a sound volume of the second engine sound is greater than a sound volume of the first engine sound.

8. An engine sound control device comprising:
at least one processor connected to a sound output device of an electric or hybrid vehicle to output a sound; and
at least one memory coupled to the at least one processor, the at least one memory storing at least one program that, when executed by the at least one processor, causes the engine sound control device to:
acquire environment information indicating a travel environment of the electric or hybrid vehicle;
acquire vehicle speed information indicating a vehicle speed of the electric or hybrid vehicle;
acquire rotation speed information indicating a rotation speed of an engine of the electric or hybrid vehicle;
determine, based on the environment information and the vehicle speed information, whether leading the speed of the electric or hybrid vehicle to a target vehicle speed is required;
in response to determining that leading the speed of the electric or hybrid vehicle to the target vehicle is not required, control the sound output device to output a first engine sound; and
in response to determining that leading the speed of the electric or hybrid vehicle to the target vehicle speed is required, control the sound output device to output a second engine sound, the second engine sound being different from the first engine sound, and being based on the target vehicle speed and the rotation speed information, wherein, when the target vehicle speed is higher than the vehicle speed indicated by the vehicle speed information, a vehicle speed evoked by the second engine sound is lower than a vehicle speed evoked by the first a engine sound.

9. The engine sound control device according to claim 8, wherein the environment information includes minimum speed information of a road the electric or hybrid vehicle is travelling on or upward slope information indicating that a travel section is an upward slope.

10. The engine sound control device according to claim 8, wherein a fundamental frequency of the second engine sound is lower than a fundamental frequency of the first engine sound.

11. The engine sound control device according to claim 8, wherein a number of higher-order harmonic components of the second engine sound is less than a number of higher-order harmonic components of the first engine sound.

12. The engine sound control device according to claim 8, wherein a sound volume of the second engine sound is lower than a sound volume of the first engine sound.

13. An engine sound control method comprising:
acquiring, by a processor connected to a sound output device of an electric or hybrid vehicle to output a sound, environment information indicating a travel environment of the electric or hybrid vehicle;
acquiring, by the processor, vehicle speed information indicating a vehicle speed of the electric or hybrid vehicle;
acquiring, by the processor, rotation speed information indicating a rotation speed of an engine of the electric or hybrid vehicle;
determining, by the processor, based on the environment information and the vehicle speed information, whether leading the vehicle speed to a target vehicle speed is required;
in response to determining that leading the speed of the electric or hybrid vehicle to the target vehicle is not required, controlling the sound output device to output a first engine sound; and
in response to the determining that leading the speed of the electric or hybrid vehicle to the target vehicle speed is required, controlling, by the processor, the sound output device to output a second engine sound, the second engine sound being different from the first engine sound, and being based on the target vehicle speed and the rotation speed information, wherein:
when the target vehicle speed is lower than the vehicle speed indicated by the vehicle speed information, a vehicle speed evoked by the second engine sound is higher than a vehicle speed evoked by the first engine sound, or
when, the target vehicle speed is higher than the vehicle speed indicated by the vehicle speed information, the vehicle speed evoked by the second engine sound is lower than the vehicle speed evoked by the first engine sound.

* * * * *